(12) United States Patent
Greene (10) Patent No.: US 12,360,549 B2
(45) Date of Patent: Jul. 15, 2025

(54) SHIFT KNOB

(71) Applicant: Brenan Greene, El Dorado Hills, CA (US)

(72) Inventor: Brenan Greene, El Dorado Hills, CA (US)

( * ) Notice: Subject to any disclaimer, the term of this patent is extended or adjusted under 35 U.S.C. 154(b) by 0 days.

(21) Appl. No.: 18/448,620

(22) Filed: Aug. 11, 2023

(65) Prior Publication Data
US 2024/0053787 A1    Feb. 15, 2024

Related U.S. Application Data

(60) Provisional application No. 63/371,170, filed on Aug. 11, 2022.

(51) Int. Cl.
*G05G 1/06*      (2006.01)
*F16H 59/10*     (2006.01)

(52) U.S. Cl.
CPC ............. *G05G 1/06* (2013.01); *F16H 59/10* (2013.01)

(58) Field of Classification Search
CPC ........ G05G 1/06; F16H 59/10; F16H 59/0278
USPC ....................................... 74/558.5
See application file for complete search history.

(56) References Cited

U.S. PATENT DOCUMENTS 4,204,551 A * 5/1980 Robinson ............ B60N 3/12
292/350

FOREIGN PATENT DOCUMENTS

JP          60180016     * 11/1985 ............ G05G 1/06

* cited by examiner

*Primary Examiner* — Terence Boes
(74) *Attorney, Agent, or Firm* — Stinson LLP (57) ABSTRACT

In one aspect, the present disclosure provides a shift knob for exchangeable personalization. The shift knob includes an elongate body, a first magnetic component, and an exchangeable cap. The elongate body has upper and lower ends with a longitudinal axis extending therebetween. The body defines a longitudinal opening extending through the lower end and configured to receive at least a portion of a gear shift assembly to secure the elongate body to the gear shaft assembly. The first magnetic component is received in the elongate body adjacent the upper end of the elongate body. The exchangeable cap includes a second magnetic component that is magnetically attractable to the first magnetic component to removably secure the cap to the upper end of the elongate body. The cap has a top surface with a design portion visible externally on the shift knob.

9 Claims, 10 Drawing Sheets

SHIFT KNOB

STATEMENT OF RELATED CASES

This application is a continuation of U.S. Ser. No. 63/371,170, filed Aug. 11, 2022, the entire contents of which are incorporated herein by reference

FIELD

The present disclosure generally relates to a shift knob.

BACKGROUND

A typical automobile is manufactured to include a generic shift knob for changing gears (e.g., forward, reserve, neutral, park) of the automobile. Based off an owner of the automobile's preference, a customized shift knob may be purchased and exchanged with the generic shift knob to add personalization to the automobile. Typically, a design is laser etched onto the customized shift knob. In order to change a design of the customized shift knob, the owner replaces the customized shift knob currently used with a new one.

SUMMARY OF DISCLOSURE

In one aspect, the present disclosure provides a shift knob for exchangeable personalization. The shift knob includes an elongate body, a first magnetic component, and an exchangeable cap. The elongate body has upper and lower ends with a longitudinal axis extending therebetween. The body defines a longitudinal opening extending through the lower end and configured to receive at least a portion of a gear shift assembly to secure the elongate body to the gear shaft assembly. The first magnetic component is received in the elongate body adjacent the upper end of the elongate body. The exchangeable cap includes a second magnetic component that is magnetically attractable to the first magnetic component to removably secure the cap to the upper end of the elongate body. The cap has a top surface with a design portion visible externally on the shift knob.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF THE DRAWINGS

Corresponding reference characters indicate corresponding parts throughout the drawings.

DETAILED DESCRIPTION

Figure 1:
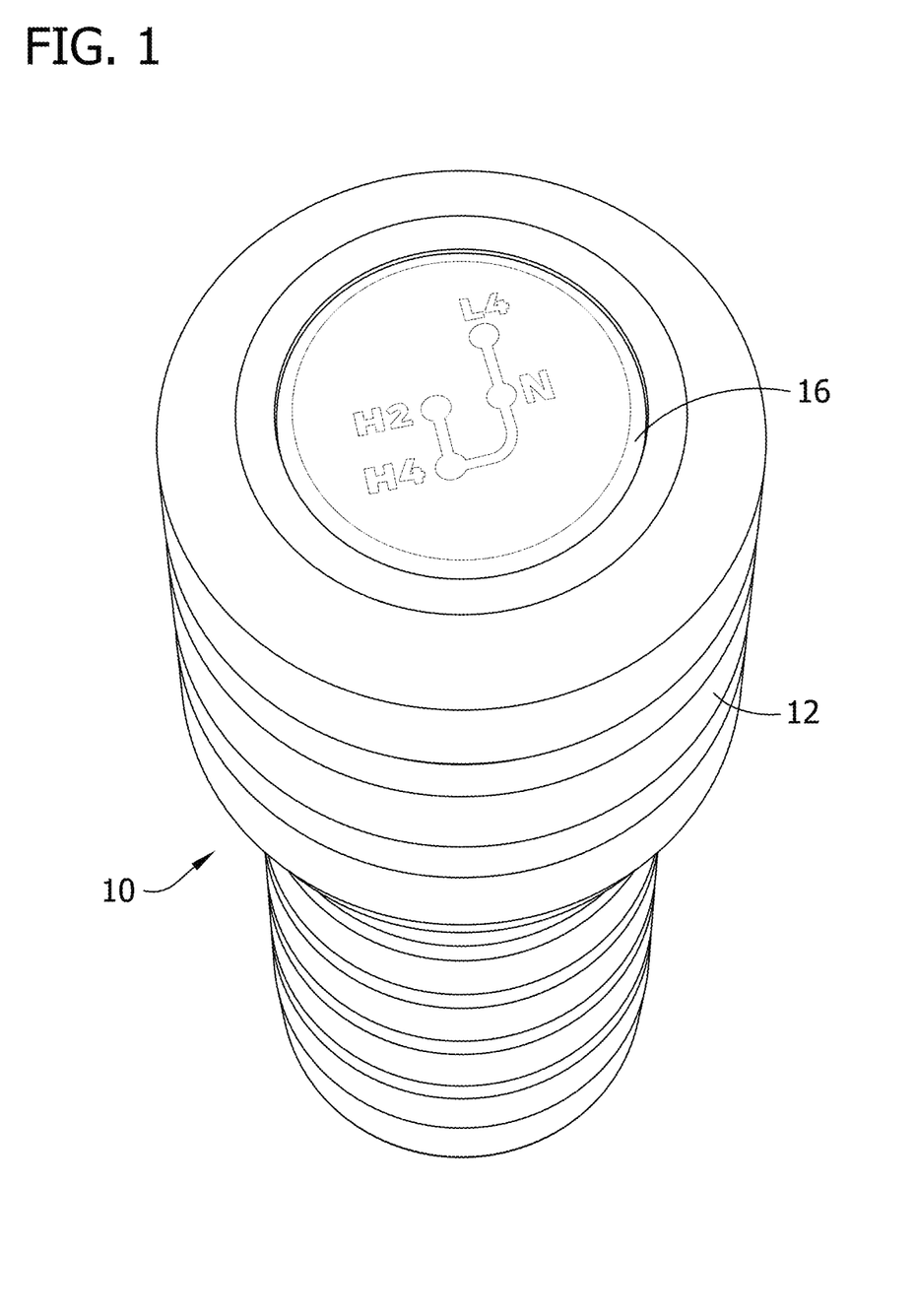
FIG. 1 is a perspective view of a shift knob of the present disclosure.
Figure 2:
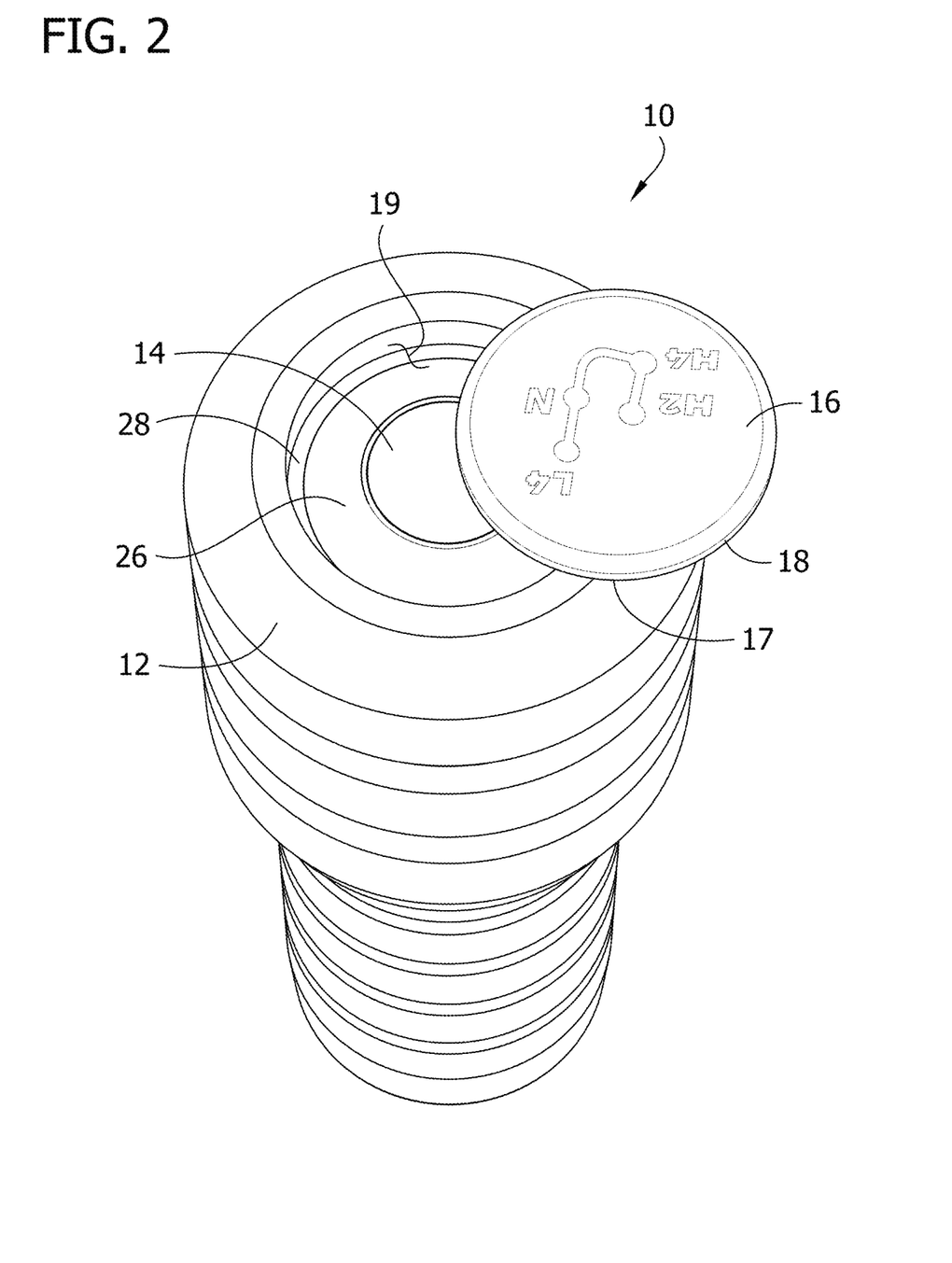
FIG. 2 is an exploded view of the shift knob of FIG. 1.

Referring to FIG. 1, the present disclosure is generally directed to a shift knob, generally indicated at 10, for a gear shift assembly (not shown) in an automobile. As shown in FIGS. 1-4, the shift knob 10 includes an elongate body 12 (FIGS. 1-2), a first magnetic component 14 (FIGS. 2 and 4), and an exchangeable cap 16 (e.g., a design cap). The first magnetic component 14 (e.g., a magnet or a magnetically attractable material) is received and secured in a portion of the elongate body 12. At least a portion of the design cap 16 includes a second magnetic component 17 (e.g., a magnet or a magnetically attractable material) that is magnetically attracted to the first magnetic component. The design cap 16 is removably received and secured in the elongate body 12 by a magnetic force between the first and second magnetic components 14, 17. In an embodiment, the first magnetic component first magnetic component 14 and the design cap 16 are positioned centrally in an upper portion of the elongate body 12.

Figure 3:
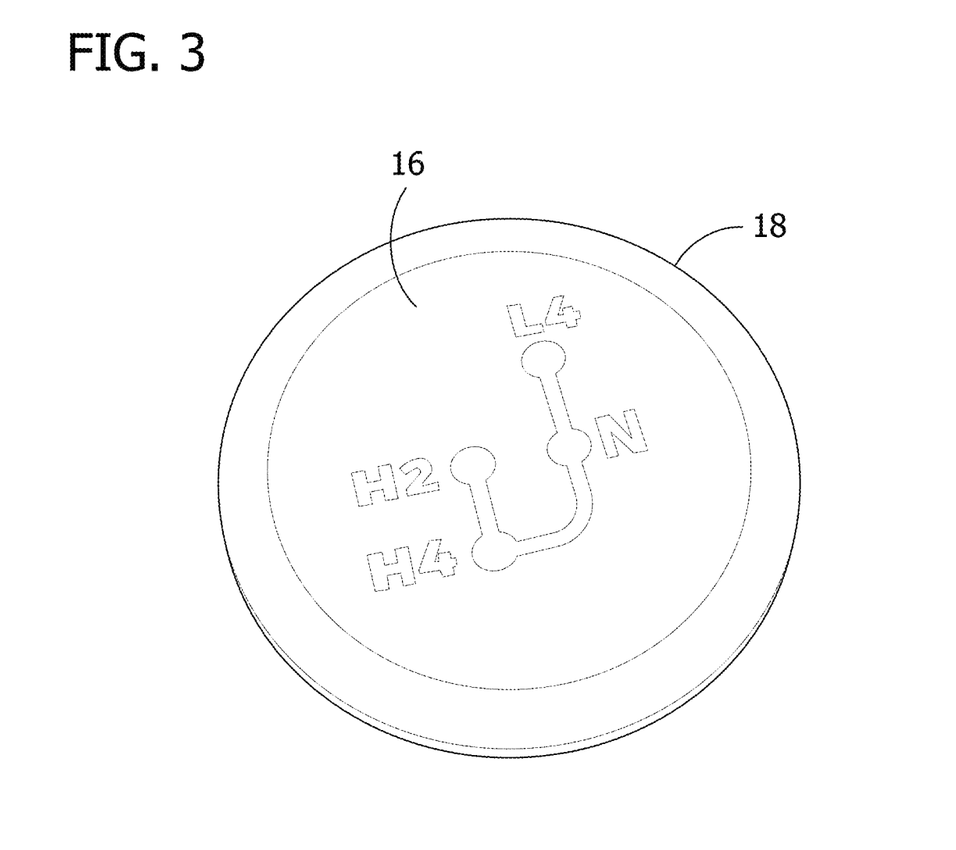
FIG. 3 is a top view of a design cap of the shift knob in FIG. 1.
Figure 4:
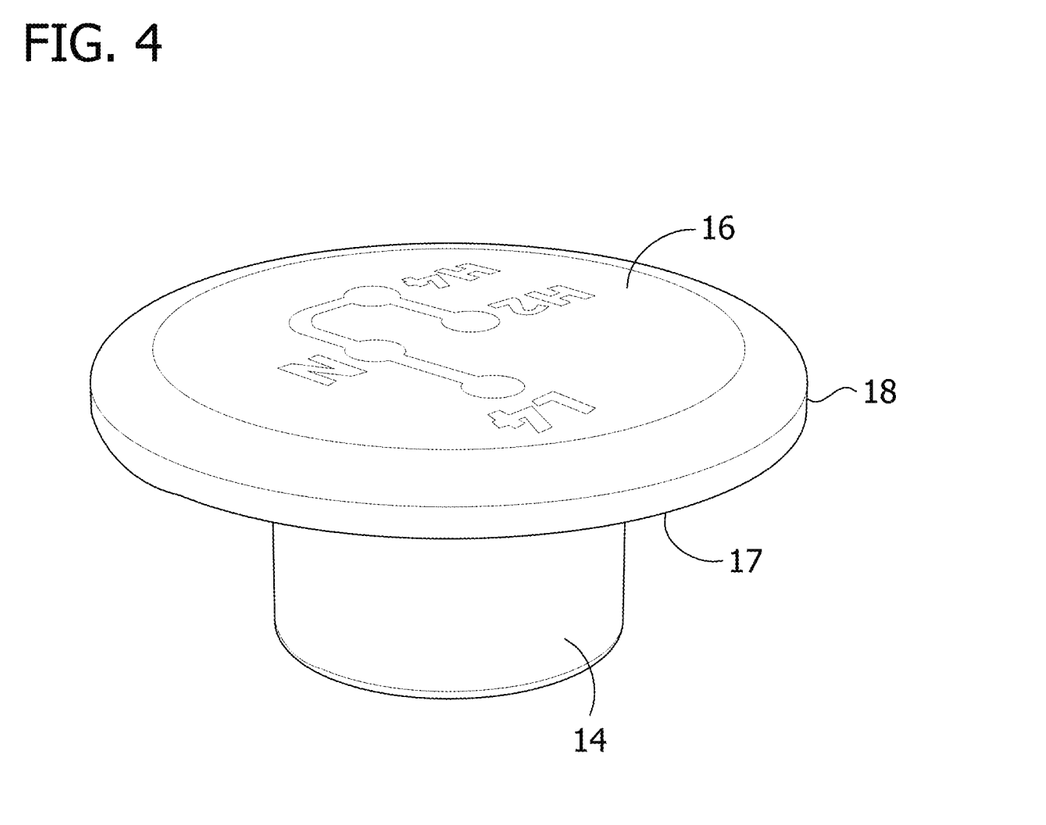
FIG. 4 is a side view of the design cap and a first magnetic component coupling.

In an embodiment, as shown in FIGS. 3 and 4, the design cap 16 includes a generally circular-shaped top surface and bottom surface connected by a side edge 18 with a thickness for being received and secured in an upper cavity 19 (FIGS. 2 and 5-8) of the elongate body 12. The design cap 16 includes the second magnetic component 17 at the bottom surface thereof to releasably secure the cap to the first magnetic component first magnetic component 14. The design cap 16 includes a decorative design on the top surface to allow for personalization to the shift knob 10. In an embodiment, the decorative design is visible as a top surface of the shift knob 10 (FIG. 1). As shown, the decorative design may include an illustration of a transfer case diagram. In other embodiments, the decorative design may vary without departing from the present disclosure. The shift knob 10 includes the design cap 16 for adding an exchangeable design feature (e.g., a plurality of design caps) to the shift knob. The design cap 16 is exchangeable by being able to be inserted (e.g., coupled) and removed (e.g., decoupled) from the elongate body 12.

Figure 5:
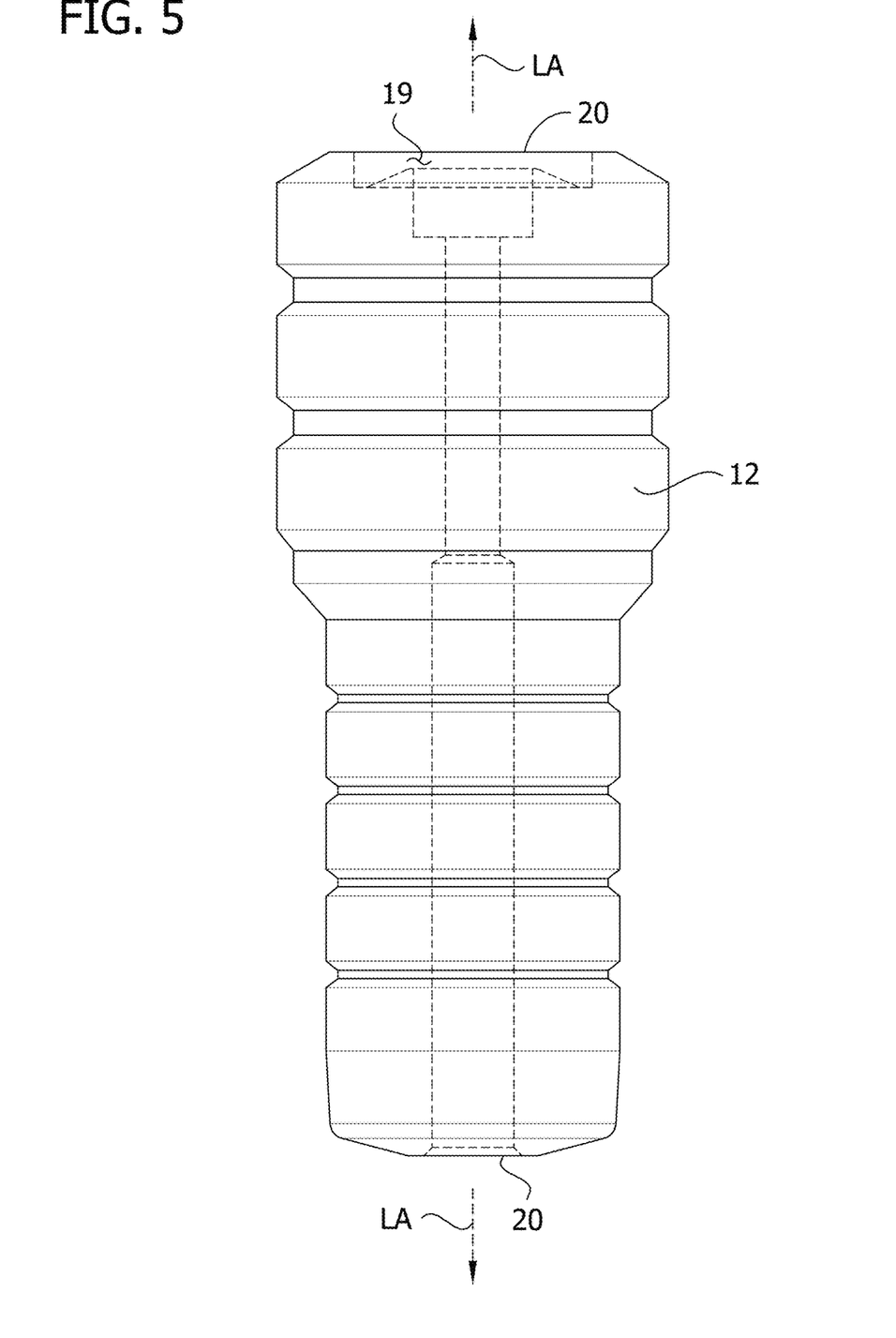
FIG. 5 is an illustration of a body of the shift knob with hidden lines displaying an elongate opening.
Figure 6:
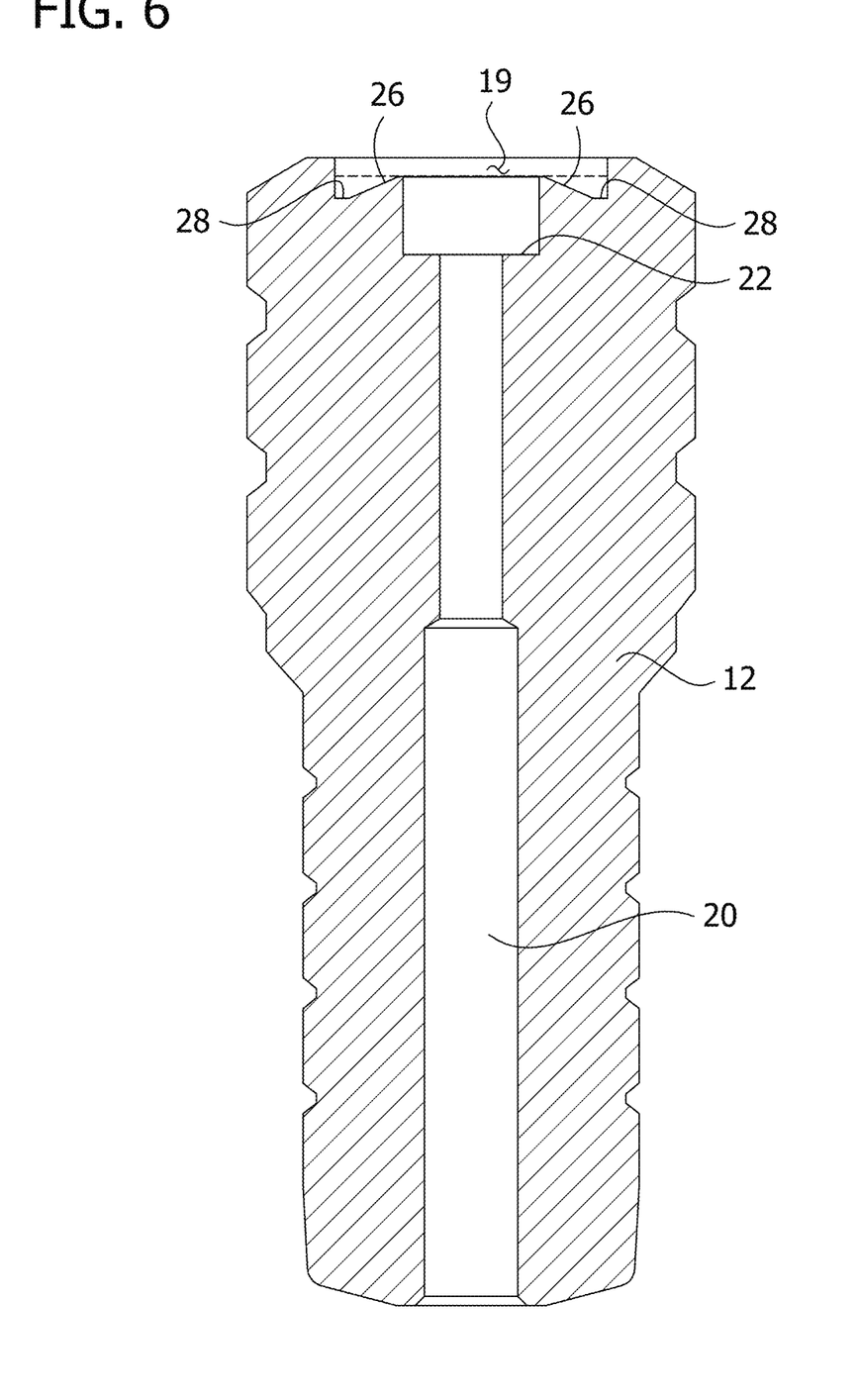
FIG. 6 is a cross section through line A-A in FIG. 5.
Figure 7:
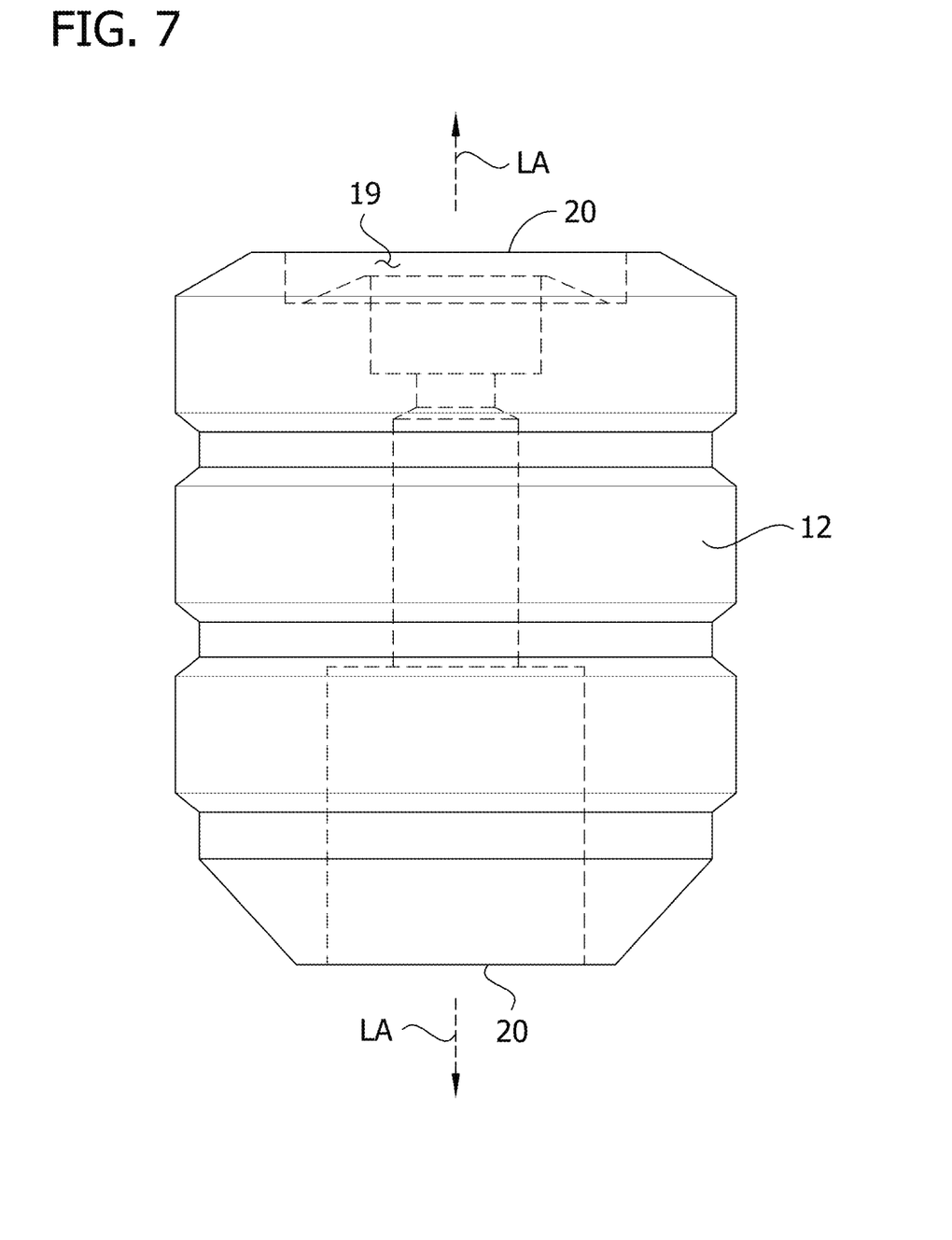
FIG. 7 is an illustration of an alternative embodiment of a body of a shift knob with hidden lines displaying an elongate opening.
Figure 8:
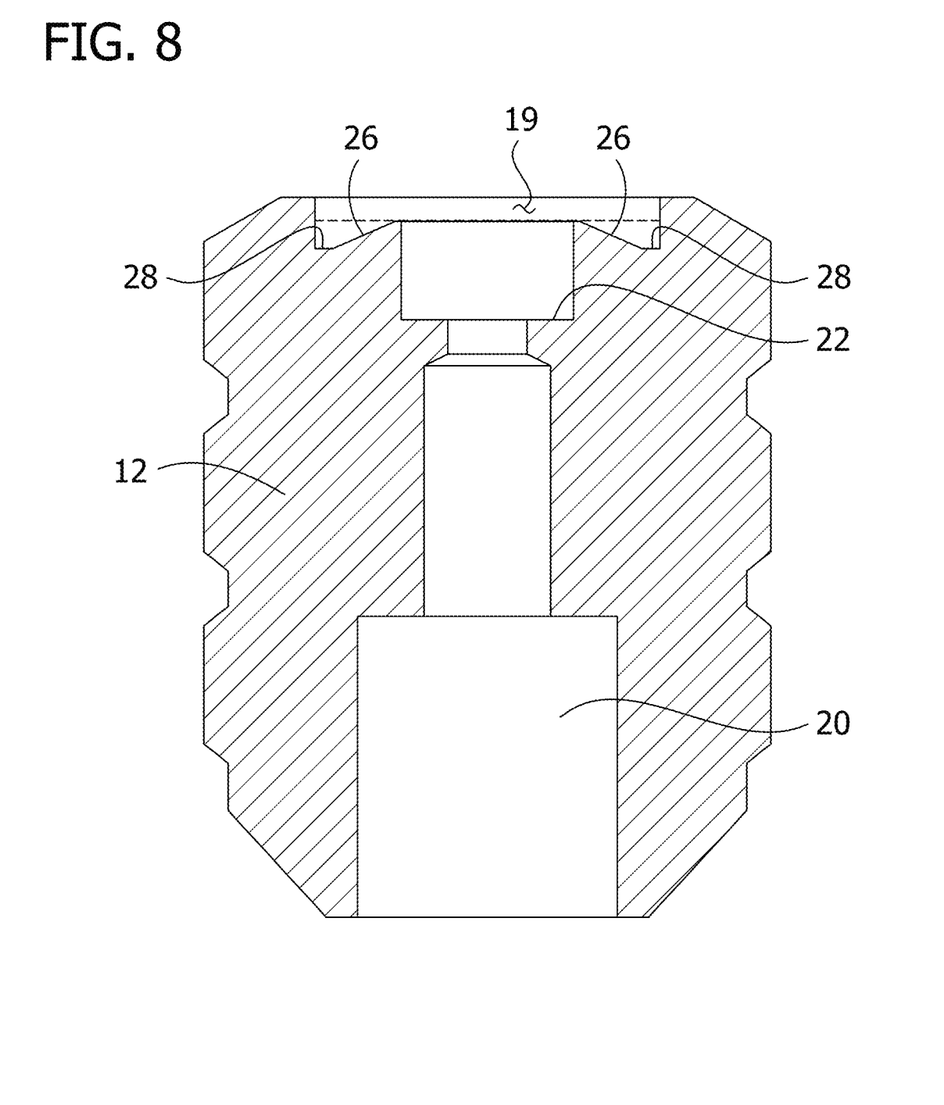
FIG. 8 is a cross section through line A-A in FIG. 7.
Figure 9:
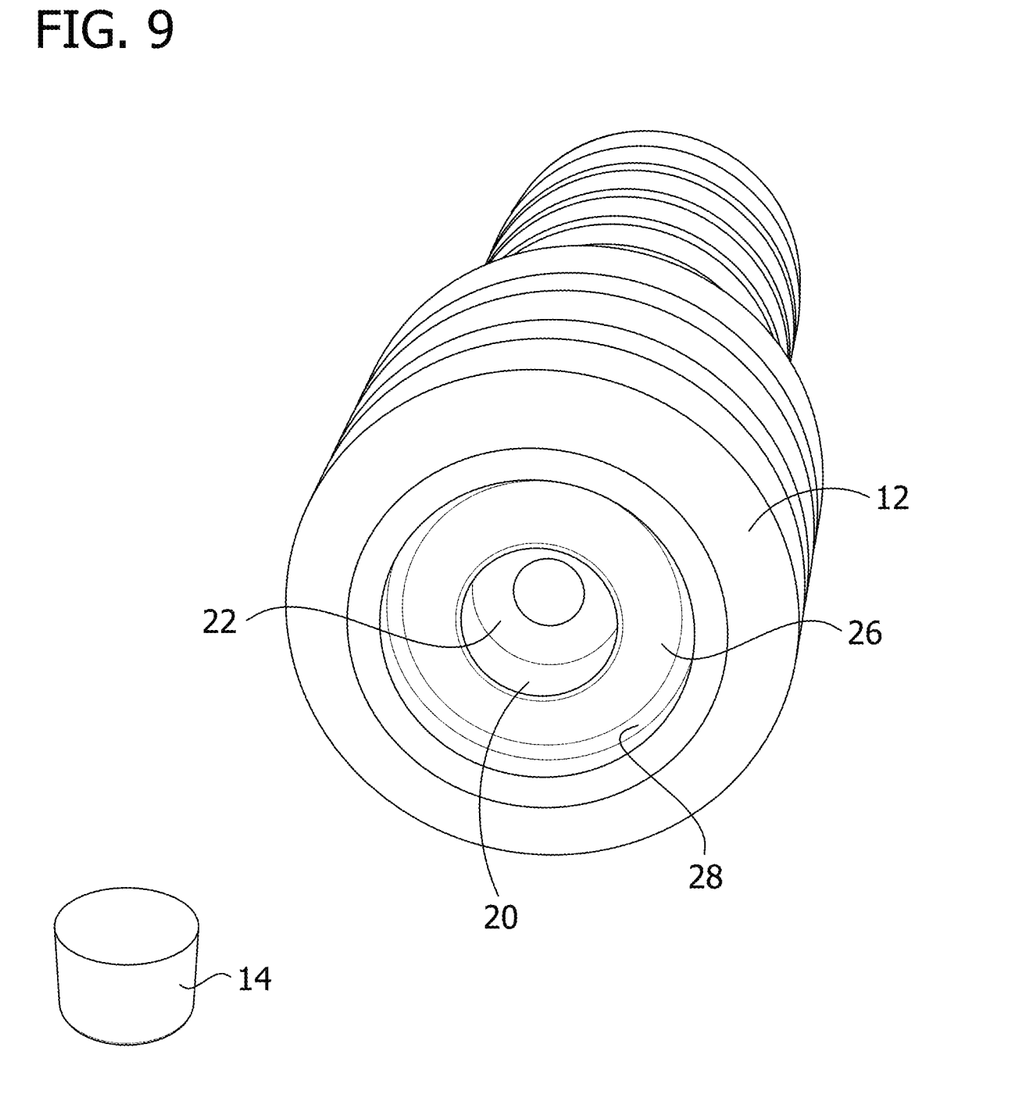
FIG. 9 is an exploded view of the elongate body and the first magnetic component of the shift knob of FIG. 1.
Figure 10:
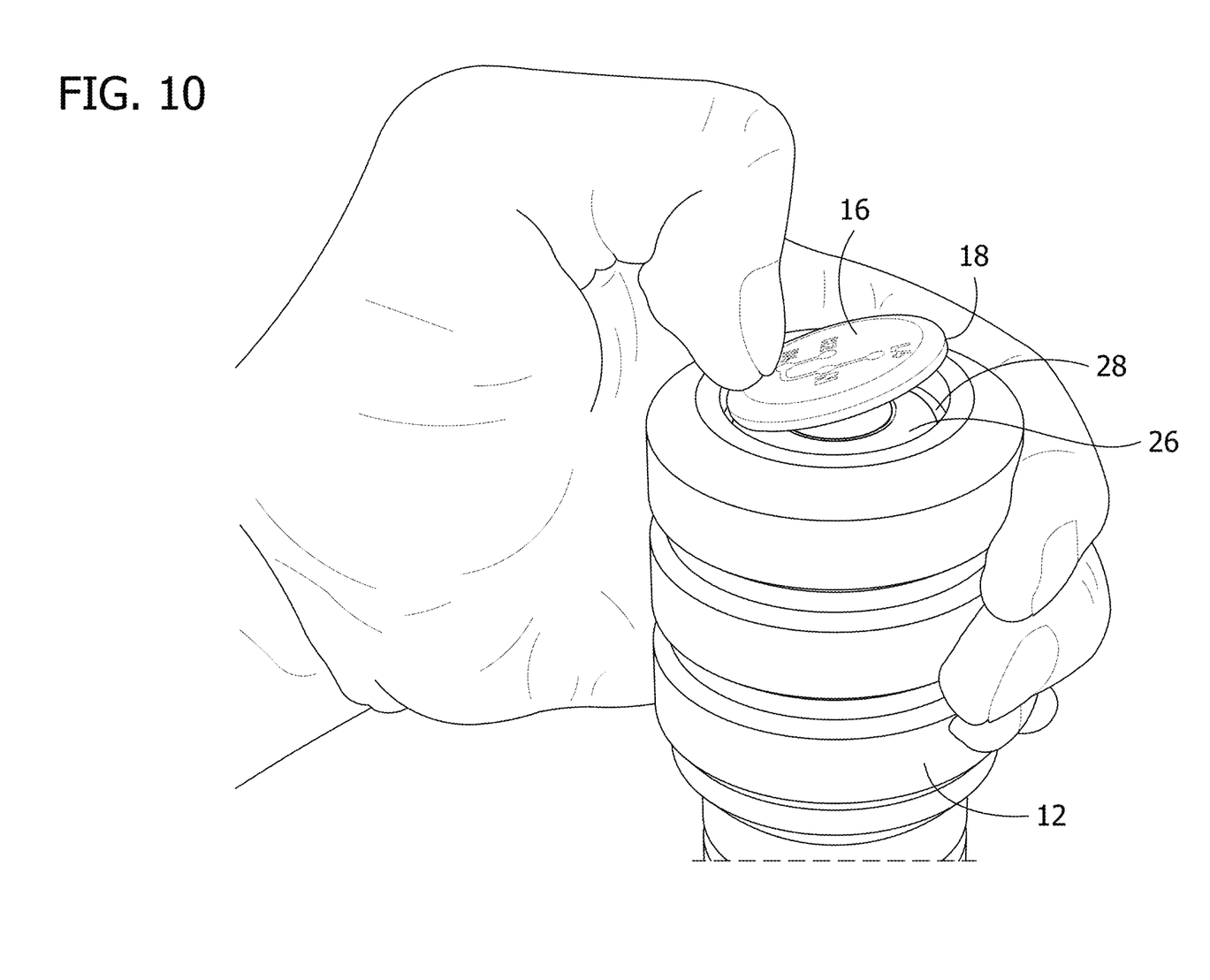
FIG. 10 is a perspective view showing removal of the design cap of the shift knob of FIG. 1.

As shown in FIGS. 5-8, the elongate body 12 includes an upper end, a lower end, and a longitudinal axis LA extending between the upper and lower ends. The desired length of the elongate body 12 may be based on the type of shift knob (e.g., a transmission shift knob, a transfer case shift knob). For example, in an embodiment, the variable length may be generally 123 mm (FIG. 5-6) or 61 mm (FIGS. 7-8). Size and shape of elongate body 12 defining the elongate opening 20 of the shift knob 10 may vary without departing from the present disclosure. For example, size and shape of elongate body 12 may be varied according to the ergonomic fit to a user's hand or style to match an interior of an automobile. For example, as shown in FIGS. 5-6, the shift knob 10 is a TR knob while the shift knob of FIGS. 7-8 is a TC knob. In an embodiment, the elongate body 12 is an aluminum material. In alternative embodiments, material may vary without departing from the present disclosure.

The elongate body 12 of the shift knob 10 defines the elongate opening 20, extending along the longitudinal axis LA through the lower surface. In an embodiment, the elongate body 12 receives a portion of the gear shift assembly (e.g., an automatic shift or shift stick) of vehicle through a bottom portion of the elongate opening 20. In an embodiment, the bottom portion of the elongate opening 20 is generally a cylindrical shape to receive the gear shift assembly. In an embodiment, the portion of the elongate body 12 that defines the bottom portion of the elongate opening 20 may include threading to secure the portion of the gear shift assembly to the elongate body. Alternatively, other methods (e.g., external screws) made be used to secure the portion of the gear shift assembly in the elongate body 12.

As shown in FIGS. 5-9, the elongate body 12 includes a first magnetic component recess 22 for receiving the first magnetic component 14. As shown, the first magnetic component recess 22 may be generally an upper portion of the elongate body 12 such that the design cap 16 may be visible on the top surface of the shift knob 10 when secured to the first magnetic component 14 in the magnetic recess. Securement of the first magnetic component 14 in the first magnetic component recess 22 may be by a press-fit mechanism or any securement mechanism that allows the first magnetic component to be coupled to the elongate body 12. The elongate-body 12 may include a ribbed portion (not shown) that is generally planar to the first magnetic component 14 when the first magnetic component is in the first magnetic component recess 22. The ribbed portion may mechanically secure the design cap 16 in the elongate body 12 while the design cap is coupled to the first magnetic component 14. In this embodiment, the design cap 16 is positioned and initially secured into the elongate body 12 by magnetism between the design cap and the first magnetic component 14. Once initially secured by the first magnetic component 14, the design cap 16 is secured into the ribbed portion of the elongate body 12 by a first downward force on a top surface of the design cap to push the design cap into the ribbed portion of the elongate body. In an embodiment, the first downward force is at a location of the design cap 16 generally planar to the first magnetic component 14. For example, the first downward force is applied generally orthogonal to the first magnetic component 14 on a center point of the design cap 16.

As shown in FIGS. 2, 5-8, and 10, in an embodiment, the elongate body 12 includes an inclined surface 26 (e.g., a slope) that terminates with a residual edge 28. In an embodiment, the inclined surface 26 is continuous for 360 degrees around the first magnetic component recess 22 while the residual edge 28 is an annulus shape radially spaced from the inclined surface 26 and is continuous for 360 degrees around the first magnetic component recess 22. To remove the design cap 16, a second downward force is applied on an end portion adjacent to the inclined surface 26. In an embodiment, the end portion adjacent to the inclined surface is radially spaced from the center point of the design cap 16. When the second downward force applied on the end portion adjacent to the inclined surface 26 is greater than magnetic force between the design cap 16 and the first magnetic component 14, the design cap becomes canted (i.e. tilted, slanted) relative to the longitudinal axis LA (FIGS. 5 and 7) of the elongate body 12 such that the side edge 18 of the design cap 16 contacts the residual edge 28 while a portion of the bottom surface of the design cap lies along the inclined surface (e.g., overhanging past the inclined surface). A portion of the bottom surface of the design cap 16 not lying on the inclined surface 26 overhangs from the elongate body 12, allowing the design cap to be taken a hold of ribbed portion (not shown) to the end portion that the second downward force was applied is pushed out of the elongate body 12 to be easily grabbed to remove from the elongate body.

By securing the design cap 16 by a first magnetic component 14 with a bevel release, the design cap may be exchanged for an alternative design cap (not shown) having an alternative design without use of mechanic tools to provide a new personalization to the shift knob 10. This allows for a new look of the shift knob without having to replace the shift knob. By being able to change personalization without changing the shift knob 10, the shift knob with the design cap 16 adds more efficient personalization to an automobile. In addition, by changing the design cap 16 instead of the shift knob 10 to change personalization, the owner may save money on changing the personalization or may change the personalization more frequently due to a lower cost to personalize.

When introducing elements of the present invention or the one or more embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above apparatuses, systems, and methods without departing from the scope of the invention, it is intended that all matter contained in the above description and shown in the accompanying drawings shall be interpreted as illustrative and not in a limiting sense.

What is claimed is:

1. A shift knob for exchangeable personalization, the shift knob comprising
    an elongate body having upper and lower ends and a longitudinal axis extending therebetween, wherein the body defines a longitudinal opening extending through the lower end and configured to receive at least a portion of a gear shift assembly to secure the elongate body to the gear shaft assembly;
    a first magnetic component received in the elongate body adjacent the upper end of the elongate body;
    an exchangeable cap comprising a second magnetic component that is magnetically attractable to the first magnetic component to removably secure the cap to the upper end of the elongate body, the cap having a top surface including a design portion visible externally on the shift knob,
    wherein the elongate body defines an upper cavity receiving the cap, wherein the upper cavity is partially defined by a lower inclined surface with a residual edge configured to enable the exchangeable cap to be canted relative to the longitudinal axis of the elongate body.

2. The shift knob of claim 1, wherein the elongate body includes a recess adjacent the upper end of the body configured to receive a first magnetic component.

3. The shift knob of claim 2, wherein the recess is of a similar shape to a shape to the first magnetic component such that the first magnetic component is secured in the recess by a press-fit connection.

4. The shift knob of claim 1, wherein the inclined surface is continuous for 360 degrees around the longitudinal axis of the elongate body.

5. The shift knob of claim 4, wherein the residual edge is continuous for 360 degrees around the inclined surface.

6. The shift knob of claim 5, wherein the exchangeable cap includes a side surface extending downward from the upper surface, therein the side surface contacts the residual edge when canted relative to the longitudinal axis of the elongate body.

7. The shift knob of claim 1, wherein the first magnetic component is a magnet and the second magnetic component includes a magnetically attractable material.

8. The shift knob of claim 1, wherein the residual edge is continuous for 360 degrees around the inclined surface.

9. The shift knob of claim 1, wherein the exchangeable cap includes a side surface extending downward from the upper surface, therein the side surface contacts the residual edge when canted relative to the longitudinal axis of the elongate body.

* * * * *